Sept. 8, 1970 TUTOMU IMAMURA 3,527,230
MEANS AND METHODS FOR CORRECTING VISUAL COLOR INSENSITIVITY
WITH LOW FREQUENCY ELECTRIC CURRENT
Filed Dec. 28, 1964 3 Sheets-Sheet 1

INVENTOR
TUTOMU IMAMURA
BY
ATTORNEY

Sept. 8, 1970 TUTOMU IMAMURA 3,527,230

MEANS AND METHODS FOR CORRECTING VISUAL COLOR INSENSITIVITY WITH LOW FREQUENCY ELECTRIC CURRENT

Filed Dec. 28, 1964

3 Sheets-Sheet 2

INVENTOR
TUTOMU IMAMURA
BY [signature]
ATTORNEY

INVENTOR
TUTOMU IMAMURA
BY Harry Price
ATTORNEY

United States Patent Office 3,527,230

Patented Sept. 8, 1970

3,527,230

MEANS AND METHODS FOR CORRECTING VISUAL COLOR INSENSITIVITY WITH LOW FREQUENCY ELECTRIC CURRENT

Tutomu Imamura, Amagasaki, Japan, assignor to Sharp Kabushiki Kaisha (Sharp Corporation) Osaka, Japan Filed Dec. 28, 1964, Ser. No. 421,570

Int. Cl. A61n *1/32*

U.S. Cl. 128—421 4 Claims

ABSTRACT OF THE DISCLOSURE

The disclosure describes a system for correcting color blindness with the use of alternating electrical voltages. Deficiencies in red color and green color sensitivity are corrected by applying electrodes adjacent the eye so that the rods and cones associated with the retina may be stimulated by using a resonant frequency of 77 cycles per second for those lacking a red color sensitivity and 42.5 cycles per second for those lacking a green color sensitivity. The electrodes for applying the alternating electrical voltages are applied closely adjacent the eye and the voltages are turned on and off at repeated intervals to achieve the desired effect.

DESCRIPTION OF INVENTION

The present invention relates to means and methods for correcting color abnormalities.

Although not limited thereto the present invention will be particularly described in its application to an apparatus for correcting color blindness or correcting tendency toward color abnormalities by use of alternating electrical voltages and currents controlled in frequencies to correspond to the color abnormalities.

The present invention is particularly directed to correcting color abnormalities in the human eye without use of colored lights and with resort to resonant A.C. currents at low frequencies as a stimulator, characterized essentially by the selective stimulation in resonance to the colors, more particularly by applying the A.C. currents at 77 c.p.s. and 42.5 c.p.s. in resonance with the red light and the green light selectively at a particular interval in order to make use of the period of maximum sensitivity of the retina, thereby causing the improvement of the color sensitivity of the same for both red and green.

An object is to provide novel methods and means for training people with abnormal color vision to perceive and appreciate normal color values.

A further object is to provide a training system for human beings to enable them to appreciate and properly evaluate normal color values.

In human beings, most types of color blindness or color abnormalities may be classified or fall into type as congenital protanopia, deuteranopea, protanomalia or deuteranomalia.

Monochromatiam (total color blindness) exists but is very rare and it may be left out of consideration.

Since most color blind patients lack red color sensitivity and green color sensitivity, the present invention will be particularly described for application to these patients but the invention is not restricted to them.

Persons afflicted with these difficulties are not totally color blind and it is therefore possible to increase their color sense by training with reasonable and selective stimulation of the weakened color sense.

It has been found that training apparatus employing colored light reflected or filtered from a light source is not effective when employed as a source of stimulation or in training of retina stimulation.

The light acceptance facilities of the human eye soon become fatigued with photochemical reaction, since the light acceptors of retina are directly stimulated by the color of the light.

The principal novel and unique feature of the present invention resides in the use of resonant frequencies of alternating or less preferably other forms of intermittent, pulsating or varying electric impulses, currents or voltages to simulate or correspond to various color values in the range of the color blindness to which the person treated is subject.

The resonant frequencies employed are those which correspond to the red and green wave lengths, and, as will be subsequently set forth, the resonant frequency of 77, with a range of 75 to 80, when applied by means of an electrode adjacent the eye, will stimulate the sensitivity to red color and tend to overcome red color blindness. At the same time a resonant frequency of 42.5, with a range of 40 to 45, if applied by means of an electrode to the eye, will stimulate the rods and cones affected by green color and enhance the sensitivity of the rods and cones of this color. These resonant frequencies which correspond to the respective colors stimulate the rods and cones to a sensitivity to these particular colors without causing color fatigue. In other words, each color is found to have a resonant frequency and if this resonant frequency is applied by means of an alternating current or voltage electrode adjacent the eye, this will stimulate the rods and cones of the retina to increase sensitivity as to these colors and train the eye to recognize these colors. These receptors convert the resonant frequencies into a sensitivity as to the color and this has an effect as if the eye was sensitive to color and such color was then transmitted through the optical nerve to be received by the brain.

A particular and unusual advantage resides in the fact that if the light acceptors in the eye are stimulated with the selective alternating voltages or currents, the selective stimulation effect will be revealed at the light acceptors of retina without causing any color fatigue due to over-long exposure.

This phenomenon is applied for training with stimulation of weakened color sense. It has been found that the retina, through its rods and cones, is sensitive to certain alternating voltages or currents which correspond in frequency to the six colors, red through violet as listed below.

There are specific frequencies of current stimulating the retina, each corresponding to the six colors red through violet which are termed resonant frequencies. These frequencies respectively increase the sensitivity of the retina. Said specific resonant frequency to each color is approximately as follows:

| Wave length of light (mμ) | Color | Resonant frequency (c.p.s.) | Range |
|---|---|---|---|
| 650 | Red | 77 | 75–80 |
| 610 | Orange | 62.5 | 60–65 |
| 575 | Yellow | 52.5 | 50–55 |
| 515 | Green | 42.5 | 40–45 |
| 465 | Blue | 35 | 32–37 |
| 415 | Violet | 28.5 | 25–30 |

The application of this resonant frequency by means of an alternating current or voltage having the same frequency will have the effect of stimulating the rods and cones of the retina so that a color sensation will be transmitted through the optic nerve corresponding to the same color and as if the receptors were sensitive to such color and such color was visible to them.

The time needed for the retina to achieve its maximum sensitivity to each primary color light is usually one second for red, two seconds for green and three seconds for blue. Therefore, if such alternating voltage or current is alternately applied to the human eye with intervals of at least three seconds, color sense training will be effected at the time when the retina gets to its maximum sensitivity.

By applying these electrodes to the eye and applying a frequency which corresponds to the above resonant frequency, the cones and rods of the retina will be stimulated to transmit through the optic nerve a sensation of said color and the retina will be sensitized to such colors. The electrodes are applied near or adjacent the eyes through the skin or percutaneously and actually in alternating voltage. For example, 77 cycles per second will give a sensation of red, whereas a voltage of 42.5 voltage per second will give a sensation of green.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
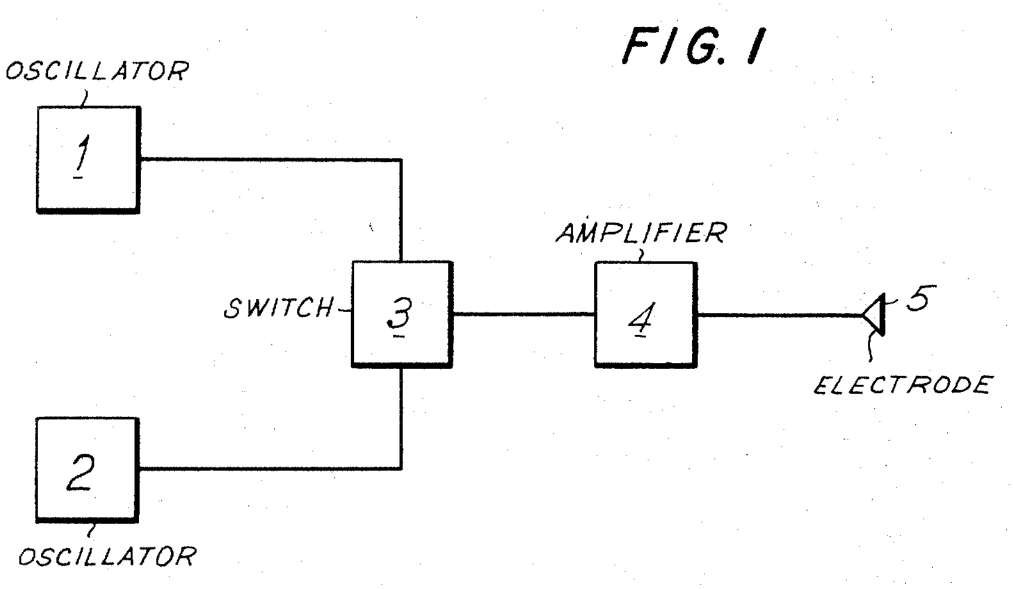
FIG. 1 is a diagrammatic layout of an oscillator-amplifier circuit.

In the circuit of FIG. 1, an oscillator 1 and another oscillator 2 are connected in parallel to an amplifier 4 through a switch 3 which can be operated mechanically or electrically or otherwise. The oscillator 1 generates 77 c.p.s. (cycles per second) alternating current to stimulate red color sense and the oscillator 2 generates approximately 42.5 c.p.s. alternating current to stimulate green color sense. The switch 3 alternately connects the output of the oscillator 1 or 2 to the amplifier 4 at short intervals as for example every three seconds. Output current 77 c.p.s. or 42.5 c.p.s. is supplied to the human body near or adjacent the eyes to stimulate the color sense through the skin or percutaneously through the electrode 5 connected to the amplifier 4.

Figure 2:
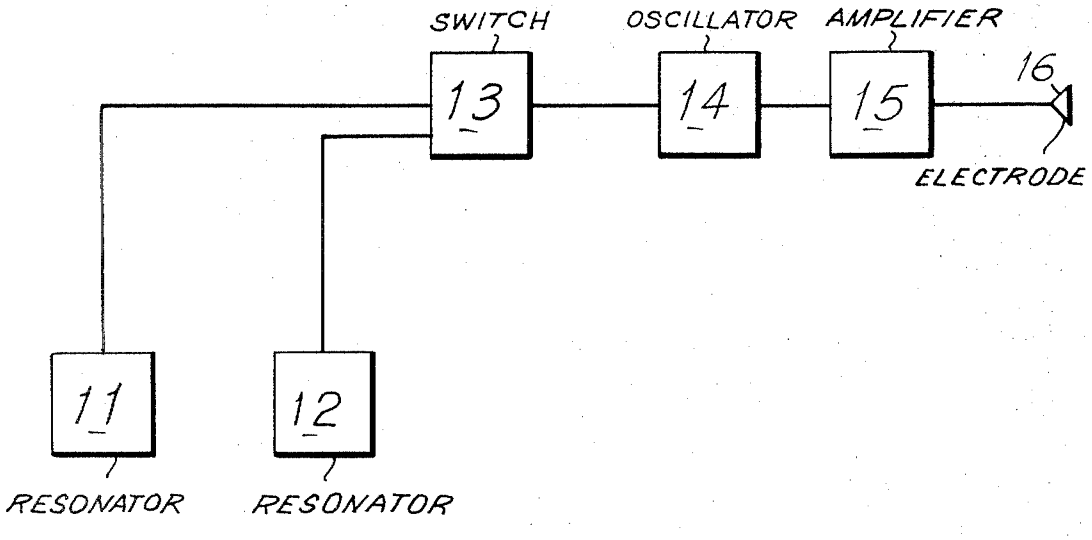
FIG. 2 is a diagrammatic layout of an alternative diagrammatic layout of an oscillator-amplifier circuit.

In the circuit of FIG. 2, an oscillator 14 has two resonant elements 11 and 12 which are connected to the oscillator 14 through a switch 13. This switch 13 alterrately connects the resonant element 11 or 12 to the oscillator 14 for short intervals such as every three seconds. Since said resonant element 11 or 12 has specific resonant frequency of 77 c.p.s. or 42.5 c.p.s., the output of the oscillator 14 alternately generates the frequency of 77 c.p.s. or 42.5 c.p.s., and the output is applied to the eye by an electrode 16.

Figure 3:
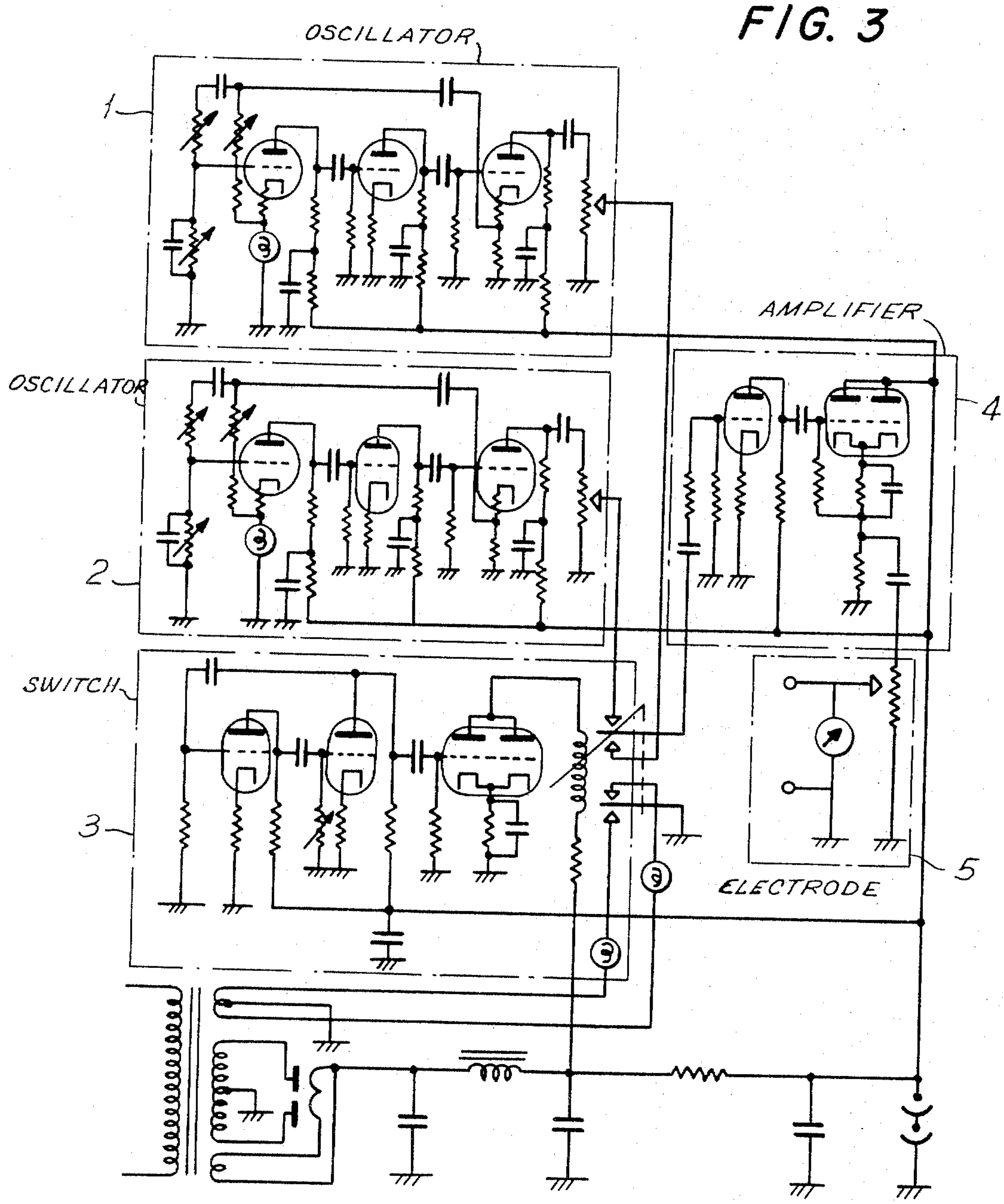
FIG. 3 is a diagrammatic view of the system shown in FIG. 1, the electrical elements contained in each block being shown in detail in FIG. 1.
Figure 4:
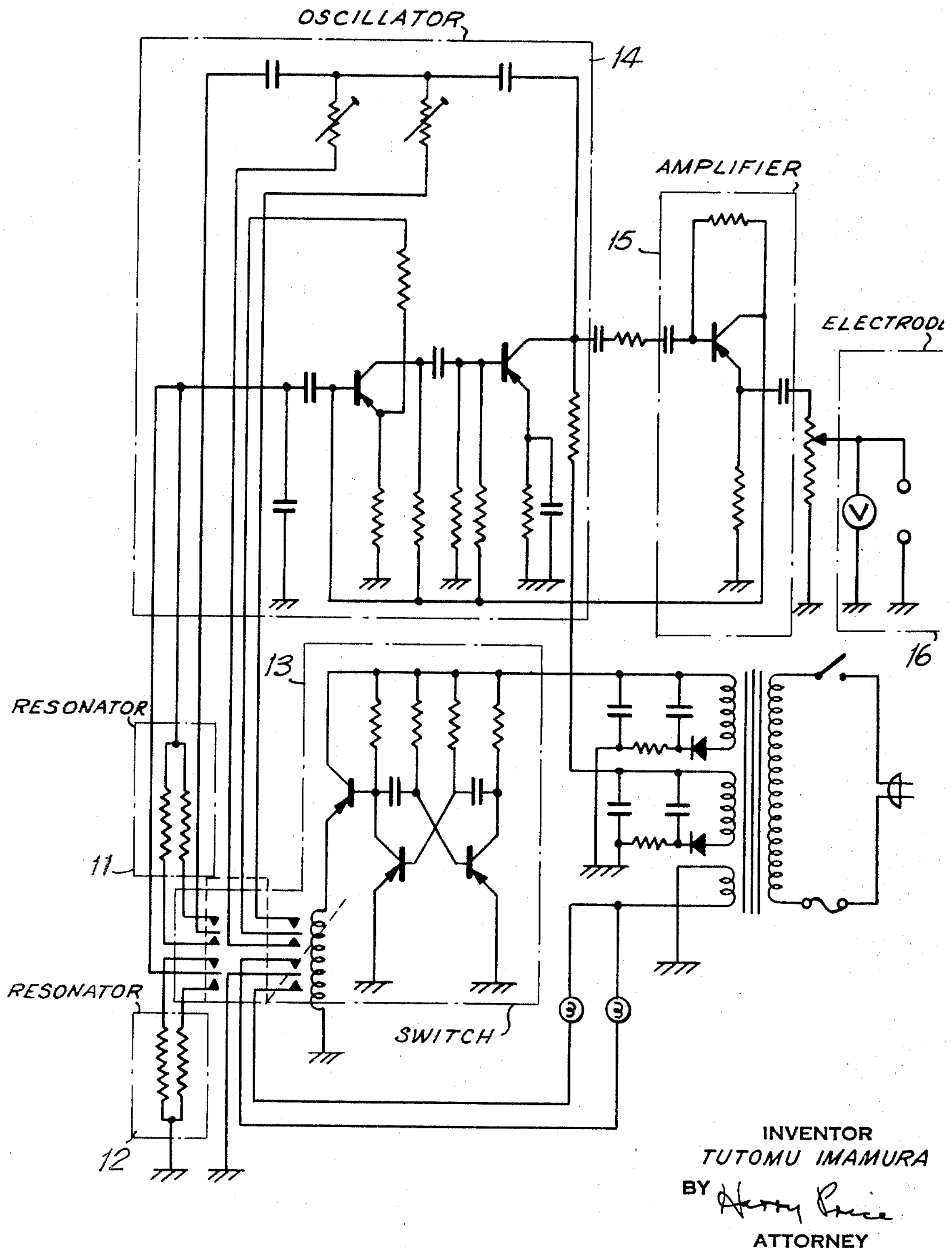
FIG. 4 is a diagrammatic view of the system shown in FIG. 2, the electircal elements contained in each block being shown in detail.

FIGS. 3 and 4 show the details of the circuit of FIGS. 1 and 2 respectively.

In respect to the significance of resonance as used in the above identified application, the impingement of light of a specific color or hue upon the human eye decreases the threshold of an electrical current having a specific frequency which corresponds to said color or hue and increases the excitability or sensitivity of the human retina. Thus the decrease of the electrical current having a specific frequency which is required for stimulating the retina, by means of the impingement of light of a certain color or hue upon the retina, shows a cooperative relationship between the color or hue of the light and the varying or pulsating current. This relationship is referred to in this specification and claims as resonance or pararesonance.

In respect to the relationship between resonance and color vision abnormalities, color vision abnormalities are not due to the defect of the receptor of the retina per se, but are caused by an imbalance of the composing function of the three primary colors, namely green, red and purple-blue, which is performed by the network between the receptors and the optic nerves.

The stimulation of the human retina by the varying or pulsating electrical signal having said resonance frequency results in stimulating selectively the color sensitive system, especially for red and green, of which the color composing function is less, and it thus improves the color composing function. Ultimately the proportion of the color composition is improved and the color vision abnormalities are lessened.

It is an important feature of the present invention that the function of the retina is improved by electrical current of a specific frequency which corresponds to a color or hue to which the eyes are less sensitive, since the color sensitive system serves to provide balanced composing function of the primary colors.

While there has been herein described a preferred form of the invention, it should be understood that the same may be altered in details and in relative arrangement of parts within the scope of the appended claims.

What is claimed is:

1. A system for correcting the human visual color abnormalities comprising: generating means for generating two different A.C. currents at 77 c.p.s. and 42.5 c.p.s. in resonance with red and green to which the patient of color abnormalities is insensitive; electrode means applied onto the patient's skin in the vicinity of the eyes so as to apply said A.C. current to the retina; and switching means connected to said generating means to determine a period of switching about 1 to 3 seconds needed for the retina to achieve its maximum sensitivity, thereby providing said electrode means alternately with said two different outputs of A.C. current at a given interval for selective and alternate application of the stimulating currents at said period.

2. A method for correcting human visual color abnormalities comprising: generating two different A.C. currents, 77 c.p.s. and 42.5 c.p.s. in resonance with red and green to which the patient having color abnormalities is insensitive and applying two different outputs of A.C. current alternately at intervals of about three seconds to the patient's skin in the vicinity of the eyes so that maximum sensitivity of the retina to red and green is achieved.

3. A system for correcting human visual color abnormalities comprising: first generating means for generating A.C. current at 77 c.p.s. in resonance with red to which the patient of color abnormalities is insensitive; second, generating means for generating A.C. current at 42.5 c.p.s. in resonance with green to which the patient of color abnormalities is insensitive; switching means connected to said first and second different generating means, and containing an element to determine a given period of about one to three seconds so that said switching means operates at every end of the time stated for the retina to achieve its maximum sensitivity; and electrode means to be installed on the patient's skin in the vicinity of the eyes provided with either of two different A.C. currents as selected by said switching means.

4. A system for correcting human visual abnormalities comprising: a means of generating stimulating A.C. currents; a means for regulating said means of generating to provide an A.C. current at 77 c.p.s. in resonance with red to which the patient having color abnormalities is insensitive; a means of regulating said means of generating to provide another A.C. current at 42.5 c.p.s. in resonance with green to which the patient of color abnormalities is insensitive; a means for switching connected, on the input side thereof, to said first and second means of regulating the frequencies of the generated stimulating A.C. currents, and also connected on the output side thereof to said means of generating stimulating A.C. currents, and containing an element which acts to present a particular period of operation of one to three seconds to take place at every end of the time needed for the retina to achieve its maximum sensitivity, thereby providing an alternating switching action, at said particular interval; and electrodes connected to said means of generating stimulating A.C. currents to be fed thereby and installed on the skin of the patient in the vicinity of the eyes.

References Cited

UNITED STATES PATENTS

| | | | |
|---|---|---|---|
| 1,373,818 | 4/1921 | Ireland | 128—420 X |
| 2,004,751 | 6/1935 | Fischer et al. | 128—420 X |
| 2,171,670 | 9/1939 | Parker | 128—422 X |
| 2,223,447 | 12/1940 | Hathaway | 128—422 X |
| 3,032,029 | 5/1962 | Cunningham | 128—1 |
| 3,172,404 | 3/1965 | Copenhaver et al. | 128—2.1 |
| 3,277,888 | 10/1966 | Otivell | 128—76.5 |
| 3,279,468 | 10/1966 | Le Vine | 128—410 |
| 3,160,159 | 12/1964 | Hoody et al. | 128—420 |
| 3,255,753 | 6/1966 | Wing | 128—410 X |

WILLIAM E. KAMM, Primary Examiner